US008969510B2

(12) United States Patent
Bosman

(10) Patent No.: US 8,969,510 B2
(45) Date of Patent: Mar. 3, 2015

(54) FLUORINATED SUPRAMOLECULAR POLYMERS

(75) Inventor: Anton Willem Bosman, Eindhoven (NL)

(73) Assignee: SupraPolix B.V., Eindhoven (NL)

( * ) Notice: Subject to any disclaimer, the term of this patent is extended or adjusted under 35 U.S.C. 154(b) by 303 days.

(21) Appl. No.: 13/302,733

(22) Filed: Nov. 22, 2011

(65) Prior Publication Data

US 2012/0136120 A1 May 31, 2012

Related U.S. Application Data

(60) Provisional application No. 61/416,864, filed on Nov. 24, 2010.

(51) Int. Cl.
| | | |
|---|---|---|
| C08G 65/22 | (2006.01) | |
| C08G 18/50 | (2006.01) | |
| C08G 18/28 | (2006.01) | |
| C08G 18/42 | (2006.01) | |
| C08G 18/75 | (2006.01) | |
| C08L 75/04 | (2006.01) | |
| C09D 175/04 | (2006.01) | |

(52) U.S. Cl.
CPC ........ C08G 18/5015 (2013.01); C08G 18/2865 (2013.01); C08G 18/4277 (2013.01); C08G 18/755 (2013.01); C08L 75/04 (2013.01); C09D 175/04 (2013.01)
USPC .......... 528/402; 528/401; 528/403; 528/405; 528/421; 528/423; 544/205; 544/320; 544/323

(58) Field of Classification Search
CPC .. C07D 251/18; C07D 239/47; C07D 239/48; C08G 65/6203; C08G 65/6218; C08G 65/331; C08G 65/333; C08G 65/33396; C08G 65/33341; C08G 83/008
USPC .......... 528/401, 403, 405, 423; 544/205, 320, 544/323
See application file for complete search history.

(56) References Cited

U.S. PATENT DOCUMENTS

| | | | |
|---|---|---|---|
| 5,476,910 A | 12/1995 | Turri et al. | |
| 5,508,380 A | 4/1996 | Turri et al. | |
| 6,320,018 B1 | 11/2001 | Sijbesma et al. | |
| 6,756,468 B2 | 6/2004 | Turri et al. | |
| 7,622,131 B2 | 11/2009 | Bosman et al. | |
| 8,410,202 B1 * | 4/2013 | Wu et al. ...................... | 524/104 |
| 2004/0087755 A1 | 5/2004 | Eling et al. | |
| 2007/0254278 A1 | 11/2007 | DeSimone et al. | |
| 2008/0260795 A1 * | 10/2008 | Baughman et al. ........... | 424/423 |
| 2009/0005519 A1 * | 1/2009 | Bala et al. ..................... | 525/533 |
| 2009/0165320 A1 | 7/2009 | DeSimone et al. | |
| 2014/0030438 A1 * | 1/2014 | Sambhy et al. ............ | 427/385.5 |

FOREIGN PATENT DOCUMENTS

| | | |
|---|---|---|
| EP | 1 369 442 B1 | 8/2011 |
| WO | WO-00/35998 A3 | 6/2000 |
| WO | WO-2007/072000 A1 | 6/2007 |
| WO | WO-2008/138927 A1 | 11/2008 |
| WO | WO-2010/002262 A1 | 1/2010 |

OTHER PUBLICATIONS

Solvay Solexis; Fomblin Z Derivatives Product Data Sheet, 2002, p. 1-3.*
National Industrial Chemicals Notification and Assessment Scheme, 2012, p. 1-20.*
Cordier, P. et al., "Self-healing and thermoreversible rubber from supramolecular assembly," Nature, vol. 451, Feb. 1, 2008, pp. 977-980, XP009096365.
Folmer et al., "Supramolecular Polymer Materials: Chain Extension of Telechelic Polymers Using a Reactive Hydrogen-Bonding Synthon," Adv. Mater., vol. 12, No. 12, 2000, pp. 874-878.
Hirschberg et al., "Supramolecular Polymers from Linear Telechelic Siloxanes with Quadruple-Hydrogen-Bonded Units," Macromolecules, vol. 32, No. 8, 1999, pp. 2696-2705.
Lange et al., "Hydrogen-Bonded Supramolecular Polymer Networks," Journal of Polymer Science: Part A: Polymer Chemistry, vol. 37, 1999, pp. 3657-3670.
Search Report mailed Jun. 1, 2011 in European Application No. 10192326.6.
Sijbesma et al., "Reversible Polymers Formed from Self-Complementary Monomers Using Quadruple Hydrogen Bonding," Science, vol. 278, Nov. 28, 1997, pp. 1601-1604.

* cited by examiner

*Primary Examiner* — Robert Jones, Jr.
(74) *Attorney, Agent, or Firm* — Gilberto M. Villacorta; Sunit Talapatra; Foley & Lardner LLP

(57) ABSTRACT

Fluorinated supramolecular polymers containing at least 5% by weight of covalently bonded fluorine atoms, based on total weight of the polymers are disclosed. The polymers comprise a fluorinated polymer chain and a (self-)complementary unit capable of forming at least three hydrogen bonds being covalently bonded to the fluorinated polymer chain. Also disclosed are materials comprising (a) a fluorinated supramolecular polymer and (b) a non-fluorinated polymer and/or (c) a fluorinated compound, the non-fluorinated polymer being a polymer containing less than 5% by weight of covalently bonded fluorine atoms, based on the total weight of the non-fluorinated polymer, and the fluorinated compound being either a low molecular weight fluorinated compound comprising at least one fluorine atom and having a molecular weight of 34 to 600 amu, or a fluoropolymer containing at least 5% by weight of covalently bonded fluorine atoms and a $M_n$ from about 600 to about 5000.

19 Claims, No Drawings

US 8,969,510 B2

FLUORINATED SUPRAMOLECULAR POLYMERS

CROSS-REFERENCE TO RELATED PATENT APPLICATIONS

This application claims priority from U.S. Provisional Application No. 61/416,864, filed Nov. 24, 2010, incorporated herein by reference in its entirety.

FIELD OF THE INVENTION

The invention relates to fluorinated supramolecular polymers comprising hydrogen bonding units and to fluorinated supramolecular materials comprising a fluorinated supramolecular polymer that show unique new processing and material characteristics due to the presence of additional physical interactions between the polymer chains that are based on multiple hydrogen bonding interactions (supramolecular interactions) such as solventless processing and self-healing behaviour.

BACKGROUND OF THE INVENTION

This invention relates to fluorinated supramolecular polymers comprising hydrogen bonding units leading to physical interactions between different polymer chains. The physical interactions originate from multiple hydrogen bonding interactions (supramolecular interactions) between self-complementary units capable of forming at least three non-covalent hydrogen bonds. Non-covalent hydrogen bonds are well known and are also indicated as "hydrogen bridges." Units capable of forming at least four non-covalent hydrogen bonds in a row, i.e. quadruple hydrogen bonding units, are a specific embodiment of said self-complementary units and are abbreviated as 4H-units. Sijbesma et al. (Science 278, 1601-1604, 1997; incorporated by reference) discloses 4H-units that are based on 2-ureido-4-pyrimidones. Reference is further made to U.S. Pat. No. 6,320,018, incorporated by reference. These 2-ureido-4-pyrimidones in their turn are derived from isocytosines.

Telechelic polymers based on polysiloxanes, (Hirschberg et al., Macromolecules 32, 2696-2705, 1999, incorporated by reference), and aliphatic polyesters, poly(ethylene-co-butylene), or polyethers have been modified with 4H-units (Lange et al., J. Polym. Sci. Part A 37, 3657-3670, 1999; Folmer et al., Adv. Mater. 12, 874-878, 2000; both incorporated by reference). Reference is further made to U.S. Pat. No. 7,622,131, incorporated by reference.

Additionally, polyurethane based polymers with 4H-units as end-cappers that can be used as hot melt adhesive are disclosed in US 2004/087755.

Fluorinated polymers and fluorinated materials comprising such fluorinated polymers are known in the art and are characterized by their unique properties such as hydrophobicity, oleophobicity, low surface-energy, high gas permeability, high lubricity, and low toxicity. Unfortunately, fluorinated polymers are also characterized by difficult processing conditions (high temperatures and/or expensive fluorinated solvents) and a limited choice in mechanical properties of the related materials. Several approaches have been developed to benefit from the desired properties of fluorinated polymers in coating applications.

Cross-linkable coating compositions based on three-component systems are disclosed in U.S. Pat. No. 6,756,468, incorporated by reference. The first component comprises a mixture of partially fluorinated prepolymers which are obtained by the reaction of (per)fluoropolyether diols and the cyclic trimer of isophorone diisocyanate (IPDI) and a non-cyclic trimer of hexamethylene diisocyanate. The second component comprises a (per)fluoropolyether diol having a lower number average molecular weight than the (per)fluoropolyether diol of the first component. The third component comprises an inert organic solvent. These coatings can be chemically cross-linked in the presence of a catalyst. Consequently, these cross-linkable coatings comprise toxic isocyanates and have a limited pot-life due to the intrinsic reactivity of the isocyanate components towards the diols. Additionally, a cumbersome three-component formulation is needed to prevent undesired cross-linking. Moreover, the cross-linked coatings lack any reversible behaviour.

In another approach, fluorinated materials for antifouling and medical applications are disclosed in US 2007/254278 and US 2009/0165320, both incorporated by reference. These materials have been obtained by photo-chemical cross-linking of methacrylate-functionalised perfluoropolyethers. Although these materials are viscous liquids before cross-linking, the resulting cross-linked materials are not thermo-reversible and need initiating species and UV-radiation to obtain their material properties.

Thermoplastic multi-block-copolymers comprising alternating perfluoropolyether blocks and aromatic, aliphatic or cycloaliphatic polyester blocks are disclosed in U.S. Pat. No. 5,476,910, incorporated by reference. These polymers show thermoplastic properties due to the presence of (non-fluorinated) rigid aromatic, aliphatic or cycloaliphatic blocks and flexible perfluoropolyether blocks in the polymer chain.

Thermoplastic polyurethanes comprising perfluoropolyether blocks are disclosed in Example 1 of U.S. Pat. No. 5,508,380, incorporated by reference. These are obtained by polycondensation of perfluoropolyether diols with 4,4'-methylene diphenyl diisocyanate (MDI) and butanediol.

There is a need in the art for improved fluorinated materials that show thermally reversible properties which allow thermal processing at lower temperatures, and display self-healing properties. Additionally, the thermo-reversible nature of these improved fluorinated materials allows the use solvent-free formulations thereby making the use of, ecologically not preferred, fluorinated solvents which are typically used for manufacturing formulations and materials comprising fluorinated polymers, superfluous.

The present invention discloses fluorinated supramolecular polymers and fluorinated supramolecular materials comprising a fluorinated supramolecular polymer. The fluorinated supramolecular polymers are liquids at elevated temperatures whereas they are elastomeric at ambient temperature. Moreover, the fluorinated supramolecular polymers according to the present invention can be formulated without the need for (fluorinated) solvents. Fluorinated supramolecular materials display self-healing properties whereby autonomous repair of damaged materials takes place thereby providing a means to repair cracks and scratches autonomously. They also maintain the protective function of a coating to shield the substrate from the surrounding environment.

SUMMARY OF THE INVENTION

It is an object of the present invention to provide fluorinated supramolecular polymers as well as a process to prepare such polymers. The fluorinated supramolecular polymers according to the present invention have better processing characteristics than fluorinated polymers known from the prior art and have autonomous self-healing characteristics without compromising the typical oleophobic and hydrophobic properties known for fluorinated polymers according to the prior art. It is another object of the present invention to provide fluorinated supramolecular polymers having the additional feature that they are easily fine-tuned with respect to their characteristics (e.g. mechanical properties, rheological properties). A further object of the present invention is to provide fluorinated supramolecular materials comprising a fluorinated supramolecular polymer.

The present invention therefore relates to a fluorinated supramolecular polymer containing at least 5% by weight of covalently bonded fluorine atoms, based on the total weight of the fluorinated supramolecular polymer, said fluorinated supramolecular polymer comprising a fluorinated polymer chain and a (self-)complementary unit capable of forming at least three hydrogen bonds, said (self-)complementary unit being covalently bonded to said fluorinated polymer chain. The present invention further relates to a fluorinated supramolecular material comprising a fluorinated supramolecular polymer.

According to a preferred embodiment of the present invention, the fluorinated supramolecular material further comprises a fluorinated polymer, a non-fluorinated polymer, and/or a fluorinated compound.

The present invention further relates to a coating composition comprising the fluorinated supramolecular material.

The present invention also relates to a sealing composition comprising the fluorinated supramolecular material.

DETAILED DESCRIPTION OF THE INVENTION

The verb "to comprise" as is used in this description and in the claims and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one."

(Self)-complementary units capable of forming at least three hydrogen bonds form in principle non-covalent moieties with each other. However, it is within the scope of this invention that these units can form non-covalent moieties with other materials capable of forming less than three hydrogen bonds. The hydrogen bonding sites comprising one Bonding Unit can form a non-self-complementary or a self-complementary binding group. Non-self-complementary means that a Bonding Unit A forms a bonding moiety A-B with a unit B, wherein B is not a Bonding Unit. Self-complementary means that two Bonding Units A form a bonding moiety A-A. It is preferred that the Bonding Unit is self-complementary.

Further in this document, the term "(self-)complementary units capable of forming at least three hydrogen bonds" is used in its abbreviated form "Bonding Unit." Hence, a "fluorinated supramolecular polymer containing at least 5% by weight of covalently bonded fluorine atoms, based on the total weight of the fluorinated supramolecular polymer, said fluorinated supramolecular polymer comprising a fluorinated polymer chain and a (self-) complementary unit capable of forming at least three hydrogen bonds, said (self-) complementary unit being covalently bonded to said fluorinated polymer chain" is in this document alternatively indicated as a "fluorinated supramolecular polymer" or as a "fluorinated supramolecular polymer comprising a Bonding Unit."

The term "fluorinated polymer chain" is used in this document to indicate a polymer chain of a fluorinated polymer. The fluorinated polymer chain is in some formulas and occasions indicated as the fluorinated polymer chain P. The fluorinated polymer chain P is formed from a fluorinated polymer wherein at least one covalent bond is replaced by a vacant position which enables the formation of a new covalent bond, e.g. a covalent bond between the polymer chain P and a (self-)complementary unit capable of forming at least three hydrogen bonds, wherein the polymer chain P and the self-)complementary unit are connected by a linking group LG.

The term "(self)-complementary units capable of forming four hydrogen bonds in a row is used in its abbreviated form "4H-unit." Hence, a "fluorinated supramolecular polymer containing at least 5% by weight of covalently bonded fluorine atoms, based on the total weight of the fluorinated supramolecular polymer, said fluorinated supramolecular polymer comprising a fluorinated polymer chain and a (self-)complementary unit capable of forming at least four hydrogen bonds in a row, said (self-)complementary unit being covalently bonded to said fluorinated polymer chain" is in this document alternatively indicated as a "fluorinated supramolecular polymer comprising a 4H-unit." The Bonding Unit and the 4H-unit are covalently attached to or covalently incorporated in the fluorinated polymer chain.

A fluorinated polymer is a herein defined as a polymer containing at least 5% by weight of covalently bonded fluorine atoms, based on the total weight of the fluorinated polymer. See for example the Chapter on Organic Fluoropolymers in Ullman's Encyclopedia of Industrial Chemistry, Vol. A11, 393, 5$^{th}$ Edition, 1988, Ed. W. Gerhartz, VCH, Weinheim.

Consequently, a non-fluorinated polymer is a polymer containing less than 5% by weight of covalently bonded fluorine atoms, based on the total weight of the non-fluorinated polymer. Preferably, the non-fluorinated polymer comprises at least one, preferably at least two Bonding Units.

A fluorinated compound is defined herein as an organic compound that comprises at least one covalently bonded fluorine atom and that has a molecular weight of 34 (molecular weight of $CH_3F$) to 600 atomic mass units (amu) or as a fluoropolymer which contains at least 5% by weight of covalently bonded fluorine atoms, based on the total weight of the fluoropolymer.

Self-healing means the ability of a material or polymer to correct any damages or disturbances brought into them, optionally by the addition of a limited amount of energy, such as short heating. Self-healing materials are well known in the art.

The fluorinated supramolecular polymers according to the present invention display the typical oleophobic and hydrophobic properties known for fluorinated polymers according to the prior art whereas they also show the (thermo-)reversible characteristics known for supramolecular polymers capable of forming hydrogen bonds. Additionally, by blending with other components, optionally modified with Bonding-Units, the mechanical and rheological properties of the blends could be modified and even further improved. Moreover, the fluorinated supramolecular polymers display self-healing properties. Thus, the fluorinated supramolecular polymers according to this invention have improved processing and blending properties and have also self-healing properties.

The Fluorinated Supramolecular Polymer

The fluorinated supramolecular polymer comprising a Bonding-Unit preferably comprises a fluorinated polymer chain and 2-50, more preferably 3-50, even more preferably 3-20, and most preferably 4-15 Bonding-Units. The Bonding-Units may be attached at the termini of the fluorinated polymer chain and/or to intermediate positions of the fluorinated polymer chain or may be incorporated in the fluorinated polymer chain.

Preferably, the number average molecular weight $M_n$ of the fluorinated supramolecular polymer comprising a Bonding-Unit is in the range from about 300 to about 100000, more preferably from about 1000 to about 20000, even more preferably from about 1800 to about 10000, most preferably from about 4000 to about 8000 Dalton.

The fluorinated supramolecular polymer comprising a Bonding-Unit according to the present invention may be a linear, star shaped, dendritic, branched, or hyperbranched (co-) polymer. The copolymers may have a random, a block, a segmented or a randomly segmented microstructure.

More preferably, the fluorinated supramolecular polymer comprising a Bonding-Unit is a linear (co)polymer with the Bonding-Unit covalently attached to the fluorinated polymer chain.

Preferably, the fluorinated supramolecular polymer comprising a Bonding-Unit is essentially amorphous, i.e. that it contains few, more preferably essentially no, crystalline domains. It is also preferred that the fluorinated supramolecular polymer comprising a Bonding-Unit has a single glass transition temperature $T_g$. The $T_g$ is preferably in the range from about −150° C. to about 200° C. More preferably, the $T_g$ is from about −150 to about 40° C., most preferably from about −130° C. to about −20° C.

The fluorinated supramolecular polymer comprising a Bonding-Unit according to the present invention may comprise ionic or ionogenic groups (ionogenic groups are groups that are capable to form an ionic group). Such polymers are more hydrophilic and have improved water-solubility, water-dispersability, and/or water swelling properties. Preferred are ionogenic groups, which are incorporated in polymer backbone via oxy groups are preferably selected from the group of methyldi(oxyethyl)amine, 2,6-bis-(oxymethyl)-pyridine and 2,2-bis(oxymethyl)-propanoic acid.

The fluorinated supramolecular polymer comprising a Bonding-Unit according to the present invention may comprise a hydrophilic polymeric block. Such fluorinated supramolecular polymers are more hydrophilic and have improved water-solubility, water-disperseability, and/or water swelling properties. The hydrophilic polymeric block is preferably a polyethylene glycol block, a polypropylene glycol block, or a poly(ethylene glycol-co-propylene glycol) block, preferably having a number average molecular weight $M_n$ from about 200 to about 50000, more preferably from about 500 to about 6000.

The Bonding-unit

The Bonding Unit comprises at least three hydrogen bonding donors and/or acceptors, preferably four, even more preferably the Bonding Unit is a 4H-unit which comprises four donors and/or acceptors. The Bonding Unit comprises preferably 5 to 6 atom rings, being saturated, unsaturated or aromatic. These rings may be all-carbon rings or may be heterocyclic rings containing carbon atoms as well as nitrogen, oxygen and/or sulphur atoms within the ring. The rings may be substituted by an oxo group.

In a preferred embodiment of this invention, the Bonding Unit is selected from the group consisting of (optionally substituted) adeninyl, guaninyl, cytidinyl, thyminyl, melaminyl, ureidopyrimidonyl (4H-unit), 1,3,5-triazinane-2,4,6-trionyl, 2-acylamino-6-amino-pyridinyl, ureido-triazine, triazolidindionyl, and tautomers thereof. More preferably, the Bonding Unit is selected from the groups shown in Scheme 1, and tautomers thereof:

Scheme 1

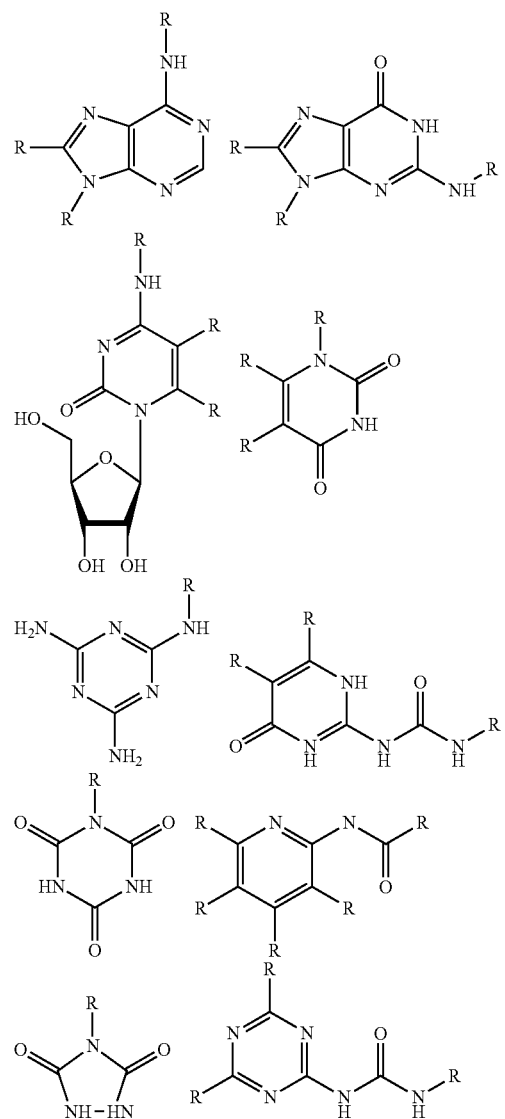

wherein R is independently selected from the group consisting of:

(a) hydrogen;

(b) $C_1$-$C_{20}$ alkyl;

(c) $C_6$-$C_{12}$ aryl;

(d) $C_7$-$C_{12}$ alkaryl;

(e) $C_7$-$C_{12}$ alkylaryl;

(f) polyester groups having the formula (5)

wherein $R^4$ is independently selected from the group consisting of hydrogen and $C_1$-$C_6$ linear or branched alkyl, n is 1-6 and m is 10 to 100;

(g) $C_1$-$C_{10}$ alkyl groups substituted with 1-4 ureido groups according to the formula (6)

 (6)

wherein $R^5$ is selected from the group consisting of hydrogen and $C_1$-$C_6$ linear or branched alkyl;

(h) polyether groups having the formula (7)

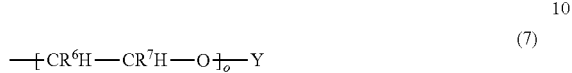 (7)

wherein $R^6$ and $R^7$ are independently selected from the group consisting of hydrogen and $C_1$-$C_6$ linear or branched alkyl and o is 10-100; and (i) oligopeptide groups consisting of sequences of 1 to 50, preferably 1 to 10, amino acids; and provided that, when there is more than one R shown in a Bonding Unit of Scheme 1, at least one R is absent to enable covalent linkage to the fluorinated polymer chain. In other words, the fluorinated supramolecular polymer according to the present invention is structurally characterised by the Bonding Units shown in Scheme 1, wherein at least one R is replaced by P, wherein P represents the fluorinated polymer chain.

According to an embodiment, the Bonding Unit is selected from the group consisting of ureidotriazines

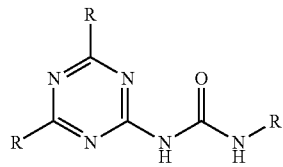

and ureidopyrimidonyls

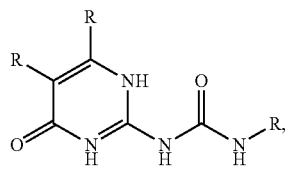

preferably ureidopyrimidonyls, wherein R is as defined above.

In another embodiment of this invention, the Bonding Unit is selected from amino ethyl imidazoline-groups, preferably 2-amino-ethyl-imidazolidone, 1-(2-[(2-amino ethyl)amino]-ethyl)-imidazolidone, and 1-(2-{2-[(2-amino ethyl amino] ethyl}amino)-ethyl]-imidazolidone as shown in Scheme 2:

Scheme 2

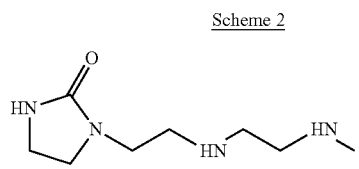

-continued

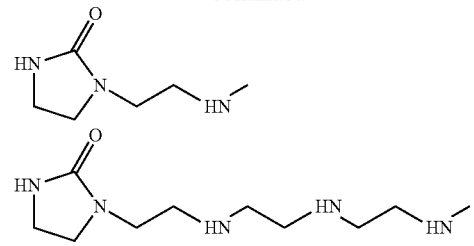

In yet another embodiment of this invention, the Bonding Unit is selected from $C_1$-$C_{20}$ bis(ureido)alkylenes, arylenes and alkarylenes, wherein the alkylene group may be linear, branched or cyclic. Preferred examples include 1,4-bis(ureido)butane, 1,5-bis(ureido)pentane, 1,5-bis(ureido)-2-methyl-pentane, 1,6-bis(ureido)hexane, 1,10-bis(ureido)dodecane, 4,4'-bis(ureido) methylene dicyclohexane, bis(ureido) isophorone, 1,3-bis(ureidomethyl)benzene, and 4,4'-bis (ureido) methylene diphenyl. The ureido group has the formula —N(H)—C(O)—N(H)—.

In a preferred embodiment of this invention, the Bonding unit is a 4H-unit, wherein the 4H-unit is represented by the general formulas (1) or (2):

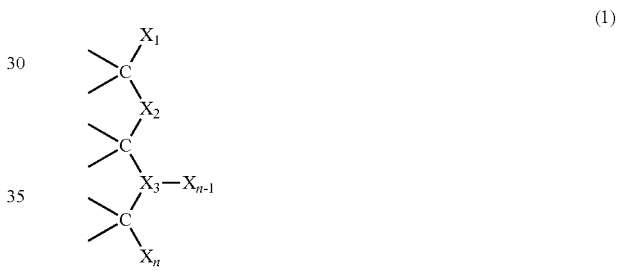 (1)

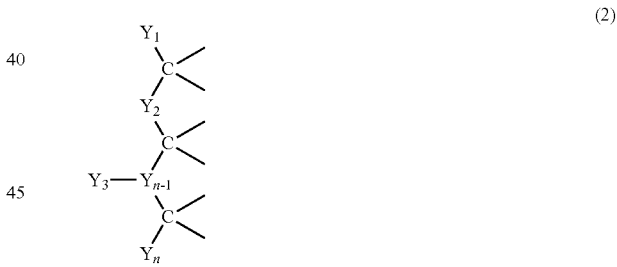 (2)

wherein the C—$X_i$ and the C—$Y_i$ linkages each represent a single or double bond, n is 4 or more, and $X_i$ represent donors or acceptors that form hydrogen bridges with the H-bridge forming monomeric unit containing a corresponding general form (2) linked to them with $X_i$ representing a donor and $Y_i$ an acceptor and vice versa. The structure of these 4H-units is in detail disclosed in U.S. Pat. No. 6,320,018 which is expressly incorporated by reference.

It is preferred that in formulas (1) and (2) n equals 4 so and that the 4H-unit comprises four donors or acceptors in the arrays $X_1 \ldots X_4$ and $Y_1 \ldots Y_4$. The 4H-unit may be self-complementary (i.e. the two hydrogen bonded units have an equal array of donors and acceptors), or non self-complementary (i.e. the two hydrogen bonded units have two different arrays of donors and acceptors). Preferably, the 4H-unit comprises two successive donors, followed by two successive acceptors, i.e. it is preferred that $X_1$ and $X_2$ are donors and $X_3$ and $X_4$ are acceptors. Preferably, the donors and acceptors are O, S, and N atoms. This 4H unit is in detail disclosed in U.S. Pat. No. 6,320,018 which is expressly incorporated by reference.

According to a more preferred embodiment of the present invention the 4H-unit has the general formula (3) or formula (4), and tautomers thereof:

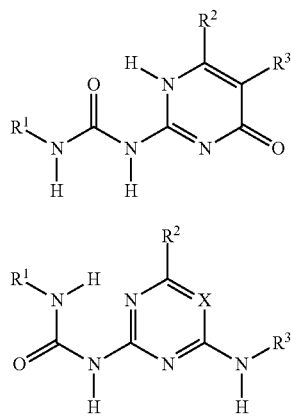

(3)

(4)

wherein X is a nitrogen atom or a carbon atom bearing a substituent $R^8$, preferably a nitrogen atom, and wherein $R^1$, $R^2$, $R^3$ and $R^8$ are independently selected from the group consisting of:
(a) hydrogen;
(b) $C_1$-$C_{20}$ alkyl;
(c) $C_6$-$C_{12}$ aryl;
(d) $C_7$-$C_{12}$ alkaryl;
(e) $C_7$-$C_{12}$ alkylaryl;
(f) polyester groups having the formula (5)

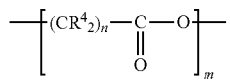

(5)

wherein $R^4$ is independently selected from the group consisting of hydrogen and $C_1$-$C_6$ linear or branched alkyl, n is 1-6 and m is 10 to 100;
(g) $C_1$-$C_{10}$ alkyl groups substituted with 1-4 ureido groups according to the formula (6)

$R^5$—NH—C(O)—NH— (6)

wherein $R^5$ is selected from the group consisting of hydrogen and $C_1$-$C_6$ linear or branched alkyl;
(h) polyether groups having the formula (7)

(7)

wherein $R^6$ and $R^7$ are independently selected from the group consisting of hydrogen and $C_1$-$C_6$ linear or branched alkyl and o is 10-100; and
(i) oligopeptide groups consisting of sequences of 1 to 50, preferably 1 to 10, amino acids; and
wherein the 4H-unit is bonded to a polymer backbone via $R^1$, $R^2$ and/or $R^3$ (so that $R^1$, $R^2$ or $R^3$ represent a direct bond) with the other R groups representing independently a side chain according to (a)-(i).

In a first preferred embodiment, the 4H-unit is bonded to a polymer chain via $R^1$ (so that $R^1$ is absent), while $R^2$, $R^3$ and $R^8$ are independently any one of the groups (a)-(i) defined above, preferably group (a) and (b), Even more preferably, $R^2$, $R^3$ and $R^8$ are independently selected from hydrogen, methyl, ethyl, isopropyl, n-butyl or t-butyl. Most preferably, $R^2$ is hydrogen and $R^3$ is methyl. Hence, the fluorinated supramolecular polymer is then schematically represented by the general formulas (8) and (9):

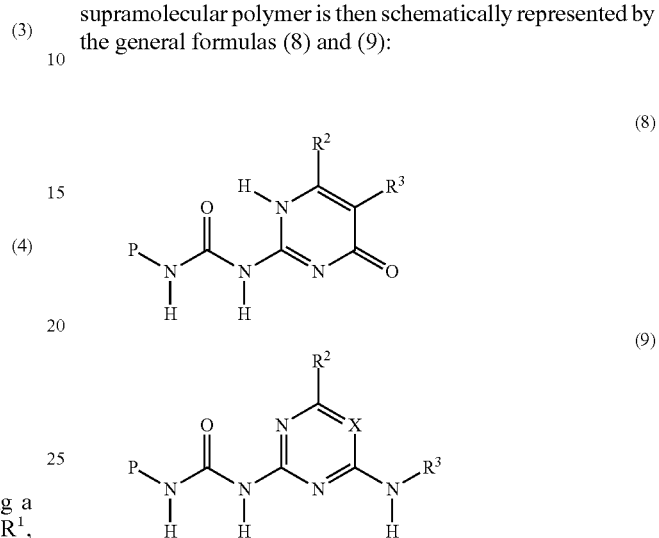

(8)

(9)

wherein P represents the fluorinated polymer chain. As will be apparent to the person skilled in the art, the fluorinated supramolecular polymer may comprise more than one, preferably 2-50, 4H-units as is described above whereas formulas (8) and (9) only depict one 4H-unit. For example, if the fluorinated polymer chain P comprises two 4H-units, formula (8) becomes then:

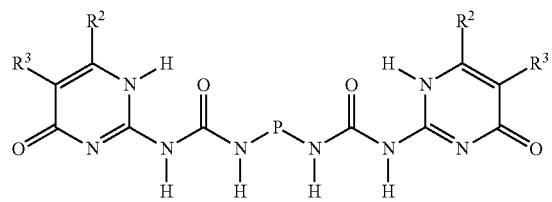

As a consequence, formulas (8) and (9) must therefore not be construed as a fluorinated polymer which is modified with one 4H-unit only. This also holds for the formulas (10), (11), (12) and (13).

In a second preferred embodiment, the 4H-unit is bonded to a polymer chain via $R^1$ and $R^2$ (so that $R^1$ and $R^2$ are both absent), while $R^3$ and $R^8$ are selected from any one of the groups (a)-(i) defined above, more preferably from group (a) and (b), most preferably from group (a). Hence, the fluorinated supramolecular polymer is then represented by the general formulas (10) and (11):

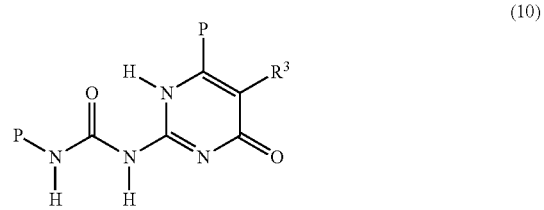

(10)

(11)

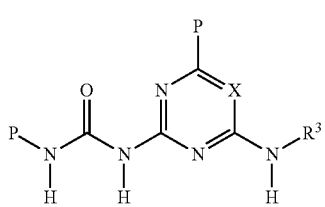

wherein P represents the fluorinated polymer chain.

In a third preferred embodiment, the 4H-unit is bonded to a polymer chain via $R^1$ and $R^3$ (so that $R^1$ and $R^3$ are absent), while $R^2$ and $R^8$ are selected from any one of the groups (a)-(i) defined above, preferably group (b). Even more preferably, $R^2$ is independently selected from methyl, ethyl, isopropyl, n-butyl or t-butyl, most preferably methyl. Hence, the fluorinated supramolecular polymer is then represented by the general formulas (12) and (13):

(12)

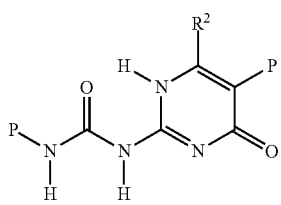

(13)

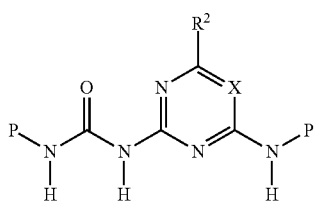

wherein P represents the fluorinated polymer chain. This third preferred embodiment is more preferred than the first and second preferred embodiments described above (cf. general formulas (8), (9), (10) and (11)).

As will be apparent to the person skilled in the art, the groups (b)-(i) defined above may be linear, branched or cyclic where appropriate.

The fluorinated supramolecular polymer can be melt-processed, preferably at temperatures lower than about 200° C., more preferably lower than about 150° C., and most preferably lower than about 100° C. Hence, the present invention also relates to a process for melt-processing a fluorinated supramolecular polymer, wherein the fluorinated supramolecular polymer is heated to a temperature of lower than 200° C.

The fluorinated supramolecular polymer can also be processed from solutions at concentrations higher than about 10% by weight, preferably higher than about 15% by weight. The solvent is preferably selected from acetate-esters, halogenated solvents (where halogen means fluorine, chlorine, bromine and/or iodine, in particular fluorine), and mixtures thereof. Hence, the present invention also relates to a process for processing a fluorinated supramolecular polymer from a solution, wherein the concentration of the fluorinated supramolecular polymer in the solution is higher than about 10% by weight, based on the total weight of the solution.

The Fluorinated Polymer

According to an embodiment of the present invention, the fluorinated polymer is selected from the group consisting of poly(tetrafluoro ethylene) (PTFE), poly(vinylidene fluoride) (PVDF), poly(vinylfluoride) (PVF), vinylidene fluoride-co-polymers, tetrafluoro ethylene-copolymers, fluorinated polyurethanes, hexafluoroisopropylidene-containing polyesters, polyether ketones, polyimides, polyamides, polycarbonates, polyfluoro(meth)acrylates, fluorosilicones, (e.g. polymethyltrifluoropropylsiloxane), perfluoropolyethers, and perfluoropolyether-containing polyurethanes.

However, according to a preferred embodiment, the fluorinated polymer is selected from the group consisting of fluorinated polyurethanes, hexafluoroisopropylidene-containing polyesters, polyether ketones, polyimides, polyamides, polycarbonates, polyfluoro(meth)acrylates, fluorosilicones (e.g. polymethyltrifluoropropylsiloxane), perfluoropolyethers, and perfluoropolyether-containing polyurethanes.

According to another preferred embodiment of the invention, the fluorinated polymer is selected from the group consisting of polyfluoro(meth)acrylates, fluorosilicones, perfluoropolyethers, and perfluoropolyether-containing polyurethanes.

More preferably, the fluorinated polymer is selected from the group consisting of PTFE, PVDF, PVF, vinylidene fluoride-copolymer, tetrafluoroethylene-copolymers, fluorinated polyurethanes, hexafluoroisopropylidene-containing polyesters, polyether ketones, polyimides, polyamides, polycarbonates, polyfluoro(meth)acrylates, fluorosilicones, perfluoropolyethers, and perfluoropolyether-containing polyurethanes.

However, it is even yet more preferred that the fluorinated polymer is selected from the group consisting of fluorinated polyurethanes, hexafluoroisopropylidene-containing polyesters, polyether ketones, polyimides, polyamides, polycarbonates, polyfluoro(meth)acrylates, fluorosilicones, perfluoropolyethers, and perfluoropolyether-containing polyurethanes. More preferably, the fluorinated polymer is selected from the group consisting of polyfluoro(meth)acrylates, fluorosilicones, perfluoropolyethers and perfluoropolyether urethanes.

Most preferably, the fluorinated polymer is a fluorinated polymer having two hydroxy end-groups, wherein the polymer chain is a perfluoropolyether diol; or a fluoropolymer having two primary amine end-groups; or a fluorinated polymer having two isocyanate end-groups.

The fluorinated polymer having hydroxy end-groups may be treated with a diisocyanate OCN—X—NCO, preferably at least 2 equivalents, more preferably 2-6 equivalents, wherein X represents a $C_2$-$C_{24}$ alkylene group, a $C_6$-$C_{24}$ arylene group, a $C_7$-$C_{24}$ alkylarylene group or a $C_7$-$C_{24}$ arylalkylene group. The diisocyanate OCN—X—NCO is preferably selected from the group consisting of toluene diisocyanate (TDI), methylene diphenyl diisocyanate (MDI), methylene dicyclohexane 4,4-diisocyanate (HMDI), isophorone diisocyanate (IPDI), and hexane diisocyanate (HDI), more preferably from the group consisting of IPDI, HMDI, MDI, TDI, 1,6-diisocyanato-2,2,4-trimethylhexane, and 1,6-diisocyanato-2,4,4-trimethylhexane. Most preferably, the diisocyanate OCN—X—NCO is isophorone diisocyanate (IPDI) or methylene dicyclohexane 4,4-diisocyanate (HMDI).

The fluorinated polymer has preferably a number average molecular weight $M_n$ of about 300 to about 100000, more preferably from about 1000 to about 20000, even more preferably about 1800 to about 10000, most preferably from about 4000 to about 8000 Dalton.

The fluorinated polymer may be a linear, star shaped, dendritic, branched, or hyperbranched (co)-polymer. The (co)- polymer may have a random, a block, a segmented or a randomly segmented structure.

The Non-Fluorinated Polymer

Preferably, the non-fluorinated polymer is a non-fluorinated polymer comprising at least two (self-)complementary units capable of forming at least three hydrogen bonds. Hence, the non-fluorinated polymer preferably comprises 0-50 Bonding-Units, more preferably 1-30, yet more preferably 2-20, and most preferably 3-10 Bonding Units. The Bonding-Units are covalently attached to the polymer chain. The fluorinated supramolecular material of this invention can obviously comprise different types of non-fluorinated polymers. Preferably, the Bonding Unit is a 4H-unit.

According to a preferred embodiment, the non-fluorinated polymer is selected from the group consisting of polyethers, polyesters, polyamides, polycarbonates, polysaccharides, polyvinylalcohols, polysiloxanes, polydienes, polyolefins, polyacrylates, poly(meth)acrylates, and copolymers thereof.

The polyether is preferably an aliphatic polyether. The polyester is preferably an aliphatic polyester, an aromatic polyester or an polyorthoester; the polyorthoester is preferably an aliphatic polyorthoester. The polyamide is preferably an aliphatic polyamide, for example a polypeptide. The polycarbonate is preferably an aliphatic polycarbonate. The polyvinylalcohol is preferably a partly esterified polyvinylalcohol, i.e. a polyvinylalcohol having a degree of esterification of 0.5 to 20%). The polydiene is preferably a polybutadiene or a hydrogenated polybutadiene. The polyolefin is preferably a hydrogenated polyolefin.

It is most preferred that the non-fluorinated polymer is selected from aliphatic (co)polyethers and aliphatic (co)polyesters.

According to another preferred embodiment of the invention, the non-fluorinated polymer is selected from the group consisting of polysaccharides, (co)polyethers based on ethylene oxide, propylene oxide, and/or tetrahydrofuran, (co)polyesters based on adipic acid and diols, preferably glycols or hydroxyacids, preferably lactic acid; (co)polyesters based on ε-caprolactone, glycolide, lactide, δ-valerolactone, 1,4-dioxane-2-one, 1,5-dioxepan-2-one, or oxepan-2,7-dione, (co)polycarbonates based on 1,6-hexanediol polycarbonate, (co)polycarbonates based on trimethylenecarbonate, 1,3-dioxepane-2-one, 1,3-dioxanone-2-one, or 1,3,8,10-tetraoxacyclotetradecane-2,9-dione, and polyorthoesters based on 3,9-diethylene-2,4,8,10-tetraoxaspiro[5.5]undecane.

The non-fluorinated polymer may comprise a blend of non-fluorinated polymers, for example blends of the preferred groups of the non-fluorinated polymers disclosed above.

The number average molecular weight $M_n$ of the non-fluorinated polymer is preferably in the range from about 1000 to about 100000, more preferably from about 2500 to about 60000, even more preferably about 5000 to about 40000, most preferably from about 7000 to about 25000 Dalton.

The non-fluorinated polymer may be a linear, star shaped, dendritic, branched, or hyperbranched (co)-polymer. The (co)-polymer may have a random, a block, a segmented or a randomly segmented structure.

The Bonding-Unit may be attached to (as a terminal groups or as a grafted group) may be incorporated in the (co)polymer chain of the non-fluorinated polymer. However, it is preferred that the Bonding-Unit is attached as a terminal group to the (co)polymer chain or that the Bonding Unit is incorporated in the (co)polymer chain. Most preferably, the Bonding-Unit is incorporated in the (co)polymer chain thereby forming an integral part of the polymer.

The non-fluorinated polymer may comprise ionic or ionogenic groups. Preferred ionogenic groups are those disclosed for the fluorinated supramolecular polymer.

The non-fluorinated polymer may comprise a hydrophilic polymeric block within the polymer chain. The hydrophilic polymeric block is preferably a polyethylene glycol block, preferably having a number average molecular weight $M_n$ from about 200 to about 50000, and more preferably from about 2000 to about 20000.

The non-fluorinated polymer can be prepared according to any method known in the art, however it is preferred that they are prepared according to one of the methods disclosed in WO 2004/016598, WO 2004/052963, EP 1687378, or WO 2006/006855, incorporated by reference.

Process for the Preparation of the Fluorinated Supramolecular Polymer

The process for the preparation of the fluorinated supramolecular polymer may be performed in bulk, dispersion, solution, emulsion, suspension or inverse phase emulsion, optionally in the presence of (fluorinated) (co)solvents and/or optionally in the presence of a catalyst. Preferably, the fluorinated supramolecular polymer is obtained in a bulk process or in a solution process in which the solids content is preferably between about 30 and about 100 weight %, more preferably between about 60 and about 99 weight %, based on the total weight of the solution.

Preferably, the fluorinated supramolecular polymer having a Bonding Unit as terminal group or as a group attached to the polymer chain is prepared by reacting a Bonding-unit comprising a reactive group with a fluorinated polymer comprising a complementary reactive group.

Preferably, the fluorinated supramolecular polymer comprising a Bonding-Unit is prepared from fluorinated polymers having functional end-groups. More preferably, the fluorinated supramolecular polymer is prepared from perfluoropolyethers (PFPE's) having functional end-groups. PFPE's are polyethers composed of multiple, sequentially linked, fluorinated aliphatic ether units in which essentially all of the hydrogen atoms have been substituted with fluorine atoms. The aliphatic ether units are typically linear or branched, saturated or unsaturated $C_1$-$C_4$ alkyl units.

These fluorinated polymers can for example be prepared by photo-oxidation of tetrafluoroethylene or hexafluoropropylene (Fomblins®), base-catalyzed polymerization of perfluoropeneoxide (Krytox®), or base-catalyzed polymerization of trimethylene oxide (Demnum®). Examples of functional end groups comprised by commercially available PFPE's are carboxylic acid groups (—$CO_2H$; Demnum® SH., Krytox® 157 FSM, and Fomblin® Z DIAC), hydroxy groups (—OH; Fomblin® Z DOL, Fomblin® Z DOL TX, Fomblin® Z TETRAOL, Fluorolink® E10/E10H), isocyanate groups (—NCO; Fomblin® Z DISOC), and carboxylic ester groups (Fomblin® Z DEAL).

Preferably, the functional end-groups of the fluorinated polymers are selected from the group consisting of carboxylic acid groups (—$CO_2H$), hydroxy groups (—OH), isocyanate groups (—NCO) and carboxylic ester groups (—$CO_2R^a$, wherein $R^a$ is a $C_1$-$C_{24}$ alkyl group or a $C_6$-$C_{24}$ aryl group, the alkyl and aryl groups being optionally substituted, wherein the alkyl groups may be interrupted by one or more heteroatoms, preferably independently selected from O and N)

More preferably, the fluorinated supramolecular polymer comprising a Bonding-Unit is prepared from a perfluoropolyether having two hydroxy end-groups. Suitable perfluoropolyethers include Fomblin® Z-Dol and Fomblin® ZDOL-TX. Even more preferably, the fluorinated supramolecular polymer comprising a Bonding-Unit is prepared from a perfluoropolyether having two hydroxy end-groups and a number average molecular weight $M_n$ of about 2000 to about 4500.

According to a first embodiment of the process of the present invention, the process for the preparation of the fluorinated supramolecular polymer comprises the step of reacting a Bonding Unit comprising one reactive group up to four reactive groups, preferably one reactive group up to two reactive groups and most preferably two reactive groups, with a fluorinated polymer having one complementary reactive group up to six complementary reactive groups, more preferably two complementary reactive groups up to three complementary reactive groups and most preferably two complementary reactive groups. Different types of Bonding Units and fluorinated polymers can be used in the same process. In this preferred embodiment of the process of the present invention, the fluorinated polymer is functionalized by reaction with a Bonding Unit In this document, the terms "reactive group" and "complementary reactive group" are used interchangeably to indicate reactive groups that are capable to form a covalent, bond with each other under conventional reaction conditions as will be apparent to a person skilled in the art. Preferably, the reactive groups and complementary reactive groups are selected such that they form a linking group LG selected from:
—C(O)—O—;
—O—;
—C(O)—N—;
—N(H)—C(O)—O—; and
—N(H)—C(O)—N(H)—;

Preferred examples of pairs of reactive groups and complementary reactive groups are:
carboxylic acid groups/hydroxy groups that can form an ester group —C(O)—O—;
carboxylic acid groups/amine groups that can form an amide group —C(O)—N—;
hydroxy groups/hydroxy groups that can form an ether group —O—;
isocyanate groups/hydroxyl groups than can form a carbamate group —N(H)—C(O)—O—;
isocyanate groups/amine groups than can form an ureido group —N(H)—C(O)—N(H)—;

Instead of a carboxylic acid group, a carboxylic ester or carboxylic acid halide group may be used. Instead of an isocyanate group, a thioisocyanate group can be used. Instead of a hydroxyl group, a thiol group may be used. As amine group, a primary, secondary or tertiary amine group may be used (although primary amine groups are preferred). The carboxylic ester group may be activated. The (thio)isocyanate group may be blocked. In this document, "hydroxyl" denotes a —OH group.

A "carboxylic acid group" denotes a —C(O)OH group.

A "carboxylic ester group" denotes a —C(O)OR group, wherein R is selected from the group consisting of $C_1$-$C_6$ alkyl, $C_6$-$C_{12}$ aryl, $C_7$-$C_{12}$ arylalkyl and $C_7$-$C_{12}$ alkylaryl groups, wherein the alkyl groups may be linear, branched or cyclic. Arylalkyl groups are groups such as phenylmethyl while alkylaryl groups are groups like 4-methylphenyl.

An "carboxylic acid halide group" denotes a —C(O)X group, wherein X is a chlorine atom, a bromine atom or a iodine atom. Preferably X is a chlorine or a bromine atom.

An "isocyanate" denotes a —NCO group.

A "blocked isocyanate" denotes a —NHC(O)OR* group, wherein R* is a good leaving group. Suitable examples of good leaving groups are phenol-derivatives phenol and thiophenol derivatives, ester derivatives such as the methyl ester of hydroxy-benzoic acid, alcohol derivatives such as 2-ethyl-hexyl-alcohol and t-butyl-alcohol, oxime derivatives such as methyl-ethyl ketoxime, imidazole groups, caprolactam groups and hydroxy-succinimide groups.

A "thioisocyanate group" denotes a —NCS group.

An "blocked thioisocyanate group" denotes a —NHC(S)OR* group, wherein R* is a good leaving group as indicated for "blocked isocyanate."

A "primary amine group" denotes a —NH$_2$ group.

A "secondary amine group" denotes a —NHR group, wherein R is selected from the group consisting of $C_1$-$C_6$ alkyl, $C_6$-$C_{12}$ aryl, $C_7$-$C_{12}$ alkylaryl and $C_7$-$C_{12}$ arylalkyl groups, wherein the alkyl groups may be linear, branched or cyclic.

An "activated amine" denotes a —C(R)=NOH group (that can be converted into an amine group via the Beckmann rearrangement), a —C(O)N$_3$ group (that can be converted into an amine group via the Curtius rearrangement), a —C(O)NH$_2$ group (that can be converted into an amine group via the Hofmann rearrangement), a —NHC(O)R group wherein R is selected from the group consisting of $C_1$-$C_6$ alkyl, $C_6$-$C_{12}$ aryl, $C_7$-$C_{12}$ alkylaryl and $C_7$-$C_{12}$ arylalkyl groups, wherein the alkyl groups may be linear, branched or cyclic including cyclic groups such as caprolactamyl (1-aza-2-cycloheptanon-1yl), a heterocyclic five or six membered group comprising 3-12 carbon atoms and 1-3 heteroatoms selected from the group consisting of O, S and N such as imidazole. According to the present invention, the "activated amine group" is preferably caprolactamyl (1-aza-2-cycloheptanon-1yl) or an 1-imidazolyl group.

A "vinyl" denotes a —CR$^a$=CR$^b$$_2$ group, wherein R$^a$ and R$^b$ are independently selected from the group consisting of hydrogen atoms and the groups defined for R.

A "(meth)acrylate" denotes a —C=C(R$^c$)—C(OH)R group, wherein R$^c$ is a hydrogen atom or a methyl group and wherein R is as defined above or a hydrogen atom.

A "thiol" denotes a —SH group.

A "halogen" denotes a —X group, where X is chlorine, bromine or iodine.

The fluorinated polymer comprising one or more complementary reactive groups can be represented in the following schematic form:

$$P—(F_{i'})_s$$

wherein P represents the polymer chain, $F_{i'}$ represents the reactive group in the fluorinated polymer that is complementary reactive with the reactive group in the Bonding Unit and s represents the number of the reactive groups in the fluorinated polymer. The complementary reactive group ($F_{i'}$) is defined previously, s is 1 or more, preferably 1 to 6, more preferably 1 to 3, most preferably 2.

According to a second embodiment of the process of the present invention, a process for preparing the fluorinated supramolecular polymer according to the present invention can schematically be written as is shown in Scheme 4.

Scheme 4

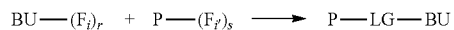

wherein BU represent a Bonding Unit, $F_i$ represents a reactive group, r is 1 to 4, P represents the polymer chain of the fluorinated polymer, $F_{i'}$ represents a complementary reactive group, s is 1 to 6, and LG represents a linking group, wherein the polymer chain of the fluorinated polymer (i.e. the fluorinated polymer chain) contains at least 5% by weight of covalently bonded fluorine atoms, based on the total weight of the polymer chain of the fluorinated polymer. In the formula BU—(F$_i$)$_r$, the reactive group F$_i$ may form a part of the BU, e.g. the amino group in isocytosine (2-amino-3H-pyrimidin-4-one).

As will be apparent to the person skilled in the art, the formula "P-LG-BU" is a simple representation for the product(s) that can be obtained in this reaction. For example, if r=1 and s=1, the major product will have the formula [P-LG-BU]. According to another example, if r=1 and s=2, a major product will have the formula [BU-LG-P-LG-BU]. According to yet another example, if r=2 and s=2, a major product will have the formula [BU-LG-P-LG-BU-LG-P—BU]$_x$. According to yet another example, if r=1 and s=4, a major product will have the formula [P-(LG-BU)$_4$]. The present invention therefore also relates to a fluorinated supramolecular polymer containing at least 5% by weight of covalently bonded fluorine atoms, based on the total weight of the polymer, said polymer comprising a (self-) complementary unit capable of forming at least three hydrogen bonds, and said polymer being obtainable by a process according to Scheme 4.

In a preferred embodiment of this second embodiment, BU is isocytosine or a derivative thereof according to formula (14):

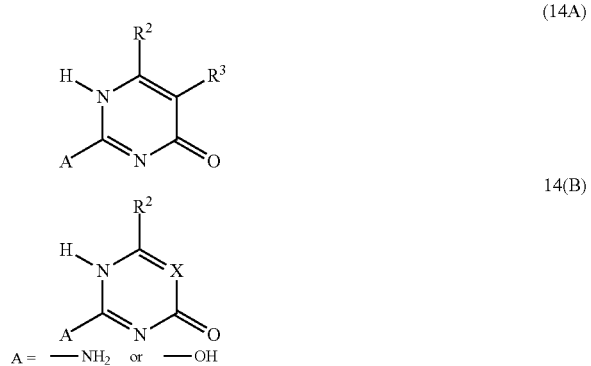

wherein R$^2$, R$^3$ and X have the meanings as described above, and wherein in formula (14) a first F$_i$ is —NH$_2$, a second F$_i$ is a terminal group of R$^3$ and is either —OH or —NH$_2$, and F$_{i'}$ is —NCO; or BU is an isocytosine derivative according to formula (15),

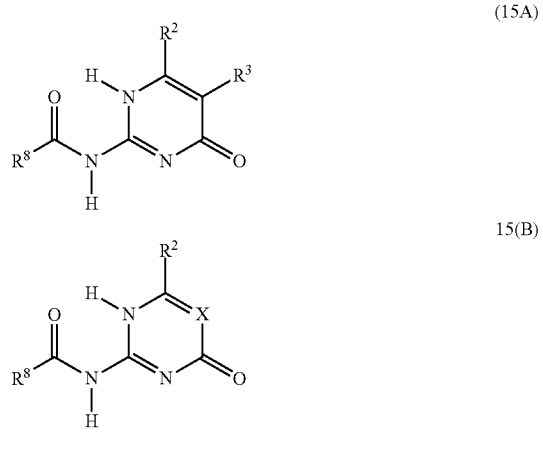

wherein R$^2$, R$^3$ and X have the meanings as described above, and wherein F$_i$ is a —NHC(O)R$^8$ group wherein R$^8$ is selected from the group consisting of C$_1$-C$_6$ alkyl, C$_6$-C$_{12}$ aryl, C$_7$-C$_{12}$ alkylaryl and C$_7$-C$_{12}$ arylalkyl groups, wherein the alkyl groups may be linear, branched or cyclic and may be interrupted by one more heteroatoms selected from the group consisting of N, O and S, including cyclic groups such as caprolactamyl (1-aza-2-cycloheptanon-1yl), a heterocyclic five or six membered group comprising 3-12 carbon atoms and 1-3 heteroatoms selected from the group consisting of O, S and N such as imidazole, and F$_{i'}$ is —NH$_2$. Formula (14A) is preferred over formula (14B) and formula (15A) is preferred over formula (15B).

The fluorinated polymer can be used in admixture with a non-fluorinated polymer as defined above, provided that the non-fluorinated polymer comprises one or more, preferably one to six, more preferably one to three, most preferably two reactive groups that are complementary reactive with the reactive group(s) in the Bonding Unit. Hence, the fluorinated supramolecular polymer is also obtainable by reacting a blend of a fluorinated polymer and a non-fluorinated polymer with the Bonding Unit.

According to an embodiment of this invention, the fluorinated supramolecular polymer comprising a Bonding Unit is prepared by (co)polymerization of monomers comprising both ethylenically unsaturated groups and Bonding Units. Hence, according to a third embodiment of the process of the present invention, the preparation of the fluorinated supramolecular polymer comprises the step of addition polymerization of a monomer comprising at least 5% by weight of covalently bonded fluorine atoms, based on the total weight of the monomer, a Bonding Unit and an ethylenically unsaturated group, or a monomer comprising at least 5% by weight of covalently bonded fluorine atoms, based on the total weight of the monomer, a Bonding Unit and an ion-polymerizable group. Even more preferably, the monomer comprises at least 5% by weight of covalently bonded fluorine atoms, based on the total weight of the monomer, a Bonding Unit and an ethylenically unsaturated group, most preferably a (meth)acrylate group.

According to a fourth embodiment of the process of the present invention, the fluorinated supramolecular polymer can also be prepared by a process comprising the step of addition co-polymerisation of a monomer comprising at least 5% by weight of covalently bonded fluorine atoms, based on the total weight of the monomer, a Bonding Unit and ethylenically unsaturated group or a monomer comprising at least 5% by weight of covalently bonded fluorine atoms, based on the total weight of the monomer, a Bonding Unit and an ion-polymerizable group, and a co-monomer. According to the present invention, the co-monomer is preferably selected from the group consisting of (partly) fluorinated C$_2$-C$_{20}$ alkyl esters of (meth)acrylates. Suitable examples include:

2,2,2-trifluoroethyl(meth)acrylate,
1,1,1,3,3,3-hexafluoroisopropyl(meth)acrylate,
2,2,3,3-tetrafluoropropyl(meth)acrylate,
2,2,3,3,3-pentafluoropropyl(meth)acrylate,
2,2,3,3,4,4-heptafluorobutyl(meth)acrylate,
2,2,3,4,4,4-hexafluorobutyl(meth)acrylate,
2,2,3,3,4,4,5,5-octafluoropentyl(meth)acrylate,
2,2,3,3,4,4,5,5,6,6,7,7-dodecafluoroheptyl(meth)acrylate,
3,3,4,4,5,5,6,6,7,7,8,8-tridecafluorooctyl(meth)acrylate,
3,3,4,4,5,5,6,6,7,7,8,8,9,9,10,10,11,11,12,12,12-heneicosafluorododecyl(meth)acrylate,
3,3,4,4,5,5,6,6,7,8,8,8-dodecafluoro-7-(trifluoromethyl)octyl(meth)acrylate, 4,4,5,5,6,6,7,7,8,8,9,9,10,10,11,11,11-heptadecafluoro-2-hydroxyundecyl(meth)acrylate, and 1H,1H,2H,2H-perfluorodecyl(meth)acrylate.

Optionally, the monomer comprising at least 5% by weight of covalently bonded fluorine atoms, based on the total weight of the monomer, a Bonding Unit and an ethylenically unsaturated group or an ion-polymerizable group and the fluorinated co-monomer are copolymerized with a further monomer which is preferably selected from the group consisting of: (meth)acrylic acid; $C_1$-$C_{30}$ branched or linear alkyl esters of (meth)acrylic acid; or (meth)acrylamides wherein the amide group may be substituted with one or two $C_1$-$C_{30}$ branched or linear alkyl groups; vinyl esters, preferably vinyl acetates; other compounds having a vinyl group wherein said compounds are preferably selected from the group consisting of pyrrolidones, imidazoles, pyridines, caprolactams, piperidones, $C_6$-$C_{24}$ aromatic compounds; $C_4$-$C_{20}$ alkadienes; lactones; lactams; and saturated or unsaturated heterocyclic compounds containing three to twelve carbon atoms and one to five oxygen, nitrogen and/or sulfur atoms. Examples of suitable comonomers are acrylic acid, methyl acrylate, butyl acrylate, 2-ethylhexyl acrylate, 2-hydroxyethyl acrylate, N,N-dimethylacrylamide, N-isopropylacrylamide, methacrylic acid, methyl methacrylate, ethyl methacrylate, butyl methacrylate, isobutyl methacrylate, 2-ethylhexyl methacrylate, lauryl methacrylate, 2-hydroxy-ethyl methacrylate, vinylacetate, N-vinylpyrrolidinone, 2-vinylpyridine-1-oxide, N-vinyl imidazole, N-vinyl pyridine, N-vinylcaprolactam, N-vinyl-2-piperidone, acrylonitrile, styrene, butadiene, isoprene, caprolacton, butyrolacton, caprolactam, ethyleenoxide, propyleneoxide, tetrahydrofuran, 3,6-dimethyl-1,4-dioxane-2,5-dione, 1,4-dioxane-2,5-dione.

According to the present invention, the relative weight of the polymer chain of the fluorinated polymer is at least 70% by weight, based on the total weight of the fluorinated supramolecular polymer. More preferably, the relative weight of the polymer chain of the fluorinated polymer is at least 75% by weight, based on the total weight of the fluorinated supramolecular polymer. Even more preferably, the relative weight of the polymer chain of the fluorinated polymer is at least 80% by weight, based on the total weight of the fluorinated supramolecular polymer.

The relative weight of the polymer chain of the fluorinated polymer is less than 100% by weight, based on the total weight of the fluorinated supramolecular polymer.

The Fluorinated Compound

The fluorinated compound may be a low molecular weight fluorinated compound. Preferably, the low molecular weight fluorinated compound is a liquid under ambient conditions (about 100 kPa and 25° C.).

According to an embodiment, the low molecular weight fluorinated compound comprises at least one fluorine atom and has a molecular weight of 34. (molecular weight of $CH_3F$) to 600 atomic mass units (amu). According to this embodiment, the low molecular weight fluorinated compound is then preferably selected from the group of fluorinated $C_6$-$C_{24}$ alkanes, fluorinated $C_6$-$C_{24}$ alkenes, fluorinated $C_6$-$C_{24}$ arenes, fluorinated $C_6$-$C_{24}$ alcohols, fluorinated $C_6$-$C_{24}$ thiols, fluorinated $C_6$-$C_{24}$ ethers, fluorinated $C_6$-$C_{24}$ acids and mixtures thereof. Examples of suitable low molecular weight fluorinated compounds are perfluorodecalin, perfluoromethyldecalin, 1H,1H,2H,2H-perfluoro-1-decanol, 1H,1H,2H,2H-perfluoro-1-octanol, 1H,1H,2H,2H-perfluoro-decanethiol, perfluorobenzene, bis(trifluoromethyl)benzene, pentadecafluoro octanoic acid, trifluoro acetic acid, ethyl nonafluorobutyl ether, perfluoro-15-crown-5-ether. Preferred low molecular weight fluorinated compounds are perfluorodecaline, perfluoromethyldecalin, 1H,1H,2H,2H-perfluoro-1-decanol, 1H, 1H,2H,2H-perfluoro-1-octanol, perfluoro-15-crown-5-ether, and mixtures thereof.

According to another embodiment, the fluorinated compound may be a fluoropolymer which contains at least 5% by weight of covalently bonded fluorine atoms, based on the total weight of the fluoropolymer. The fluoropolymer has preferably a kinematic viscosity of about 20 to about 2000 cSt at 20° C. The fluoropolymer has preferably a $M_n$ from about 600 to about 5000, more preferably from about 1000 to about 2000. Preferably, the fluoropolymer is selected from the group consisting of perfluoropolyethers (PFPE), such as the different PFPE-oils with the brand names Galden®, Fomblin® (both from Solvay-Solexis), Krytox® (from DuPont), Demnum® (from Daikin Industries), or Hostinert® (from Hoechst). Preferred liquid PFPE's are Galden® D02 TS, Fomblin® HC-series, Fomblin® HV 25/9, Fomblin® Y-series, Fomblin® W-series, Fomblin® Z-series, Krytox® 143-series, and Demnum® S-series. The fluoropolymer is different from the fluorinated polymer disclosed above since the latter has preferably a number average molecular weight $M_n$ of about 100 to about 100000.

The Fluorinated Supramolecular Material

According to an embodiment of the present invention, the fluorinated supramolecular material comprises a fluorinated supramolecular polymer described above. Obviously, the fluorinated supramolecular material may comprise more than one of fluorinated supramolecular polymers, e.g. fluorinated supramolecular polymers of different chemical nature, of different molecular weight, comprising different kind of Bonding-Units, and/or different numbers of Bonding-Units.

According to this embodiment, the fluorinated supramolecular material comprises about 1% by weight to about 100% by weight of the fluorinated supramolecular polymer, based on the total amount of the fluorinated supramolecular material. More preferably, the fluorinated supramolecular material comprises about 5% by weight to about 50% by weight, even more preferably about 10% by weight to about 30% by weight, of the fluorinated supramolecular polymer, based on the total weight of the fluorinated supramolecular material.

According to this embodiment, the fluorinated supramolecular material preferably comprises about 1% by weight to about 100% by weight of the fluorinated supramolecular polymer [component (a)] and about 0 wt. % to about 99 wt. % of a fluorinated polymer [component (b)], a non-fluorinated polymer [component (c)], fluorinated compound [component (d)] or any combination thereof, based on the total weight of the fluorinated supramolecular material. More preferably, the fluorinated supramolecular material comprises about 5% by weight to about 50% by weight of component (a) and about 50 wt. % to about 95 wt. % of component (b), component (c), component (d) or any combination thereof, based on the total weight of the fluorinated supramolecular material. Even more preferably, the fluorinated supramolecular material comprises about 10% by weight to about 30% by weight of component (a) and about 70 wt. % to about 90 wt. % of component (b), component (c), component (d) or any combination thereof, based on the total weight of the fluorinated supramolecular material. Hence, the fluorinated supramolecular material comprises at least component (a), and optionally: component (b), component (c), component (d), a combination of components (b) and (c), a combination of components (b) and (d), a combination of components (c) and (d), or a combination of components (b), (c) and (d). Most preferably, the fluorinated supramolecular material comprises component (a), a combination of components (a) and (c), a combination of components (a) and (d), or a combination of components (a), (c) and (d).

According to another embodiment, the fluorinated supramolecular material comprises component (c) and component (d), in which component (c) comprises at least 1 Bonding Unit, preferably at least 1 4H-Unit, and wherein component (d) is a fluoropolymer. In this embodiment, component (c) comprises preferably 2-10 Bonding Units, more preferably 2-10 4H-Units. The fluorinated supramolecular material according to this embodiment then comprises about 70 wt. % to about 99 wt. % of component (c) and about 1 wt. % to about 30 wt. % of component (d), more preferably, about 80 wt. % to about 95 wt. % of component (c) and about 5 wt. % to about 20 wt. % of component (d). All these weight ranges are based on the total weight of component (c) and component (d).

According to yet another embodiment of the present invention, the fluorinated supramolecular material comprises component (c) and component (b) and/or (d), in which component (c) comprises at least 1 Bonding Unit, preferably at least 1 4H-Unit, and wherein component (d) is a fluoropolymer. In this embodiment, component (c) comprises preferably 2-10 Bonding Units, more preferably 2-10 4H-Units. The fluorinated supramolecular material according to this embodiment then comprises about 70 wt. % to about 99 wt. % of component (c) and about 1 wt. % to about 30 wt. % of component (b) and/or (d), more preferably, about 80 wt. % to about 95 wt. % of component (c) and about 5 wt. % to about 20 wt. % of component (b) and/or (d). All these weight ranges are based on the total weight of component (c) and components (b) and/or (d).

Other Ingredients

The supramolecular fluorinated material according to the present invention can also comprise a further functional component that provides a certain property to the material. Examples are components that provide biological activity (i.e. a therapeutic, diagnostic, medicinal or prophylactic effect), rheological function (i.e. thickeners or thixotropic agents), stabilizing compounds (i.e. UV-stabilizers, pH-buffers, or anti-oxydants), optical (i.e. dyes, pigments, or liquid crystalline compounds), or aesthetic activity. Advantageously, the supramolecular fluorinated material comprises less than 50% by weight, preferably from 0.05-40% by weight, of the further functional component, based on the total weight of the supramolecular fluorinated material.

The functional component can be used as such, or can be chemically modified with one or more Bonding-Units.

Method of Preparing the Supramolecular Fluorinated Material

The present invention also provides a method of preparing the fluorinated supramolecular material. This method comprises optionally blending of component (a), component (b), component (c) and/or component (d). According to an embodiment of the present invention, this method comprises blending component (a), component (b), component (c), and/or component (d) together with a further functional component. This blending of components (a), (b), (c) and/or (d) results in supramolecular fluorinated materials with the desired material properties. In particular, if more than one of components (a), (b), (c) and (d) comprise one or more Bonding-Units, these will all strongly contribute to strong physical interactions between the different components in the blend. In particular, it is therefore preferred according to the present invention that at least both components (a) and (c) have at least one Bonding-Unit, where as the optional other components may have no Bonding Units. The blending of all components can be done by conventional processes, i.e. solution processing or melt-processing, or a combination of both. It is preferred that the method comprises blending of components (a), (c) and/or (d). Component (b) is therefore an optional component of the supramolecular material.

The concept of supramolecular blending of the different components (a), (b), (c) and/or (d), also allows tuning the mechanical performance of the fluorinated supramolecular materials together with its typical fluoro-characteristics.

The fluorinated supramolecular material can be obtained in three different ways: method (i) comprises blending the different components with each other in conjunction with a medium consisting of one or more (fluorinated) solvents, in which these components are dissolved or dispersed, preferably dissolved. This first method (i) is preferably followed by processes for dissolved polymers known in the art.

A second method (ii) comprises blending the different components with each other in the bulk at elevated temperatures, preferably 40° to 150° C. (vide infra). This second method (ii) is preferably followed by solventless processes for polymers known in the art.

Both methods (i) and (ii) can also be combined. Preferably, blending takes place according to method (ii) without the need for (fluorinated) solvents. According to an especially preferred embodiment of the invention, methods (i) and (ii) comprises the in situ preparation of components (a) and/or (b).

Processing according to method (i) can be done from organic solvents or aqueous media, depending on the solubility of different components. Preferably, a solvent or mixture of solvents is used such as hexafluoroacetone, hexafluorotoluene, fluorinated ethers, ethylacetate, butylacetate, propylenecarbonate, water, acetone, methyl ethyl ketone, THF, DMSO, DMF, NMP, supercritical $CO_2$ or aliphatic alcohols, such as ethanol. The supramolecular fluorinated material is preferably obtained by solvent casting, dip-coating, freeze-drying, precipitation casting, spray coating, painting, roll-coating, foaming, solvent spinning, wet spinning, electro-spinning, micro-contact printing, ink jet printing, particulate-leaching techniques, phase-separation techniques or emulsion processes.

If the fluorinated supramolecular material is a coating composition, the choice of solvent(s) should be such that the desired viscosity of the solution for the coating process is obtained, preferably polar solvents should be used to reduce hydrogen bonding between the polymers. Moreover, the solvent has preferably a low boiling point in order to facilitate removal from the solvent(s) after the coating process, and the solvent (or solvent mixture) has preferably only limited toxicity. Therefore, drying of the fluorinated supramolecular material is required after the coating process.

As will be known by persons skilled in the art, special care needs to be taken to clean the substrate surface when the fluorinated supramolecular material is applied as a coating to this substrate. For example, wettability of the substrate can be improved by liquid etching techniques, such as the use of chromic acid, aqueous sodium hydroxide and fuming sulfuric acid, or plasma etching techniques.

Processing according to method (ii) is done at temperatures sufficient high to allow processing of the components although temperatures should be not too high to prevent degradation of the different components. Preferably, processing temperatures are in between 40° C. and 150° C., most preferably in between 50° C. and 120° C. The supramolecular bioresorbable or biomedical materials are preferably obtained by extrusion, reactive-extrusion, micro-extrusion, fused deposition modeling, molding, lamination, film-blowing, reaction injection molding (RIM), spinning techniques, rapid prototyping, or by thermal or photocuring of a coating.

Optionally, the supramolecular fluorinated material can be used to prepare a hydrogel, i.e. a gel in which the liquid is water. Hydrogels can be obtained by persons skilled in the art by balancing the ratio of hydrophilic and hydrophobic components in components (a) and optionally (b) in the formulation. Hydrogel materials have a high water content, potentially mimicking different roles of the extracellular matrices in tissue. Consequently, hydrogels find many uses in biomedical applications such as controlled drug delivery, delivery matrices or as coatings.

According to this invention, additional ingredients other than (a) (b), (c) and/or (d), may be added to the material such as excipients known in the art such as for example anti-oxidants and pH-buffers.

Applications

The supramolecular fluorinated materials according to the invention are preferably suitable for applications related to coating applications. The present invention therefore also relates to a coating composition comprising the supramolecular fluorinated material. The coating composition is preferably selected from the group consisting of protective coatings, low-friction coatings, superhydrophobic coatings, textile coatings, paper coatings, sizing agents, antistick coatings, weather resistant paints, coil coatings, anticorrosive coatings, architectural coatings, oil-repellant coatings, biomedical coatings for prostheses, implants, stents, catheters, or other medical devices that come in contact with living tissue. According to another more preferred application, the supramolecular biomedical material is useful as filling material for cosmetic surgery and in reconstructive plastic surgery. Hence, the present invention therefore also relates to a surgery filling material composition comprising the supramolecular fluorinated material.

EXAMPLES

The following examples further illustrate the preferred embodiments of the invention. When not specifically mentioned, chemicals are obtained from Aldrich, including the fluorinated polyethers.

ZDOL 4000 is a methylol terminated fluorinated polyether with the following formula:

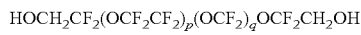

With p/q=0.8-1.2, and $M_n$=4000

ZDOL TX is an ethoxylated fluorinated polyether with the following formula:

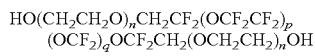

With p/q=0.8-1.2, n=1.3, and $M_n$=2100

Examples 1 to 4 describe different Bonding Units

Example 1

2-Acetylbutyrolactone (2 mL) and guanidine carbonate (3.3 g) were put to reflux in absolute ethanol (20 mL) in the presence of triethylamine (5.2 mL). The solution became yellow and turbid. After overnight heating at reflux, the solid was filtered, washed with ethanol, and suspended in water. The pH was adjusted to a value of 6-7 with an HCl-solution, and the mixture was stirred for a while. Filtration, rinsing of the residue with water and ethanol and subsequent drying of the solid gave the pure 5(2-hydroxy ethyl)-6-methyl isocytosine. 1H NMR (400 MHz, DMSO-d6): δ 11.2 (1H), 6.6 (2H), 4.5 (1H), 3.4 (2H), 2.5 (2H), 2.1 (3H).

Example 2

Methyl-4,4-dimethyl-3-oxo-pentanoate (50.0 g) and guanidine carbonate (56.9 g) are heated overnight under a nitrogen atmosphere in ethanol (400 mL) at an oil bath temperature of 80° C. The reaction mixture is filtered, the filtrate is evaporated down, water (50 mL) is added and the pH is brought to 6 by addition of acetic acid. The white precipitate is filtered, washed with several portions of water and dried in vacuo to give a quantitative yield of 6-t-butyl isocytosine. 1H NMR (400 MHz, DMSO-d6): δ 10.6 (1H), 6.4 (2H), 5.45 (1H), 1.1 (9H).

The resulting 6-t-butyl isocytosine (10.4 g) and hexyldiisocyanate (68 g) were stirred and kept under an argon atmosphere. The mixture was subsequently heated overnight at an oil bath temperature of 100° C. After cooling to room temperature, the clear solution becomes turbid. Hexane (300 mL) is added, and the mixture is stirred to obtain a suspension of fine particles. The solid is filtered, washed with several portions of hexane and dried, resulting in an isocyanate-functional 4H-unit. Yield: 86%, 1H NMR (400 MHz, CDCl3): δ 13.2 (1H), 11.9 (1H), 10.1 (1H), 5.8 (1H), 3.2 (4H), 1.6 (4H), 1.4 (4H), 1.2 (9H).

Example 3

Methylisocytosine (5.2 g) was added to isophoronediisocyanate (IPDI, 50 mL) and subsequently stirred at 90° C. under an argon atmosphere for 3 days. The resulting clear solution was precipitated in heptane. The white gom was collected, heated in 150 mL heptane, cooled on ice, and filtered. The same procedure was repeated once more with the white residue, resulting in a white powder formed by the isocyanate functional 4H-unit. 1H NMR (400 MHz, CDCl3): δ 13.1 (1H), 12.0 (1H), 10.1 (1H), 5.9 (1H), 4.1-3.1 (3H), 2.1 (3H), 2.0-0.9 (15H).

Example 4

The isocyanate functional 4H-unit of Example 3 (28 g) was dissolved in chloroform (0.5 L), and thereafter hydroxy ethyl methacrylate (HEMA, 9.6 mL) and 8 drops of dibutyl tin dilaurate (DBTDL) were added. The mixture was stirred at an oil bath temperature of 90° C. for 4 hours, and was then cooled and filtered. The filtrate was concentrated and dropped into an excess of diethylether. The precipitate was collected by filtration, and was washed with diethylether. Drying in vacuo gave a solid product containing a methacrylate functional 4H-unit. 1H NMR (400 MHz, CDCl3): δ 13.1 (1H), 11.8 (1H), 10.1 (1H), 6.1 (1H), 5.8 (1H), 5.6 (1H), 5.0 (1H), 4.3 (4H), 4.1-3.6 (1H), 3.1-2.9 (2H), 2.1 (3H), 2.0 (3H), 1.8-1.5 (2H), 1.4-0.8 (13H).

Examples 6 to 13 describe different Bonding-Unit comprising fluoropolymers

Example 6

ZDOL TX (524 mg) was dissolved in butylacetate (2 mL) at 70° C. together with one drop of dibutyltindilaurate (DBTDL), followed by the addition of the isocyanate of Example 2 (160 mg). The reaction mixture was subsequently heated to 100° C. while stirring in an inert atmosphere. After 4 hours the reaction mixture was diluted with butylacetate (2 mL) and cooled down to 25° C. Upon standing, a gum separated from the butylacetate which was isolated and dried in vacuo resulting in a flexible clear film. The materials has a Tg of −112° C. and is a liquid above 130° C.

Example 7

ZDOL 4000 (574 mg) was dissolved in butylacetate (2 mL) at 70° C. together with one drop of dibutyltindilaurate (DBTDL), followed by the addition of the isocyanate of Example 2 (101 mg). The reaction mixture was subsequently heated to 100° C. while stirring in an inert atmosphere. After 4 hours a the solvent was removed by drying in vacuo at 60° C. The resulting flexible material has a Tg of −116° C. and is a liquid above 130° C.

Example 8

ZDOL 4000 (716 mg) was dissolved in a 1/1 mixture of hexa-fluoroxylene and chloroform (3 mL) and heated to 70° C. followed by the addition of the isocyanate of Example 3 (131 mg) and 1 drop of DBTDL. After 16 h stirring at 70° C., the reaction mixture was diluted with chloroform (10 mL) and cooled to 25° C. upon which a white slurry precipitates which was isolated and dried in vacuo, resulting in a flexible film.

Example 9

ZDOL 4000 (780 mg) was dissolved in a 1/1 mixture of hexa-fluorobenzene and chloroform (3 mL) and heated to 70° C. followed by the addition of the bis(isocyanate) of Example 4 (94 mg). After 2 h the solvent was removed in vacuo and a rubbery like material was obtained. The materials has a Tg of −117° C. and is liquid-like above 140° C.

Example 10

ZDOL 4000 (2.57 g) was mixed with isophoronediisocyanate (355 mg) and stirred for 16 h at 80° C. Subsequently the reaction mixture was heated to 120° C. followed by the addition of propylenecarbonate (0.5 mL) and 6-methyl-isocytosine (200 mg). After 2 hours stirring under an inert atmosphere, the reaction mixture was cooled to 25° C. upon which a solid separated from the solution. This solid was isolated, dissolved in hot hexafluoroxylene and filtered over celite, followed by drying in vacuo resulting in a white rubbery material.

Example 11

The methacrylate containing 4H-unit of Example 5 (200 mg) was mixed together with 1,1,1,3,3,3-hexafluoroisopropyl methacrylate (4 g), t-butyl methacrylate (0.5 g), AIBN (12 mg) and transfer agent mercapto ethanol (75 microliter) in DMF (15 mL). The mixture was subsequently degassed by purging with argon for 1 hr prior to polymerization. Polymerization was conducted at 80° C. for about 3 to 4 hours, after which the mixture was cooled down to room temperature and the polymer was recovered by precipitation into THF/hexane (3/1 v/v). The resulting fluoropolymer was obtained after isolation of the precipitate followed by drying in vacuo.

Example 12

ZDOL 4000 (1.80 g) was mixed with isophoronediisocyanate (243 mg) and stirred for 16 h at 80° C. Subsequently the reaction mixture was heated to 120° C. followed by the addition of butylacetate (1 mL) and 1,5-diamino-2-methyl6-methylpentane (62 mg). After 2 hours stirring under an inert atmosphere, the reaction mixture was cooled to 70° C. following by the addition of ethanol (20 mL) upon which a solid separated from the solution. This solid was isolated and dried in vacuo resulting in a rubbery material.

Examples 13 describe synthesis of components (b)

Example 13

Bis-hydroxy-functional polycaprolactone (PCL, $M_n$=1250, 1.25 g), predried in vacuo at 100° C., was mixed with IPDI (1.25 g) at 40° C. followed by the addition of 1 drop DBTDL and stirred for 3 h under an argon atmosphere resulting in a clear liquid. To this reaction mixture was added the isocytosine-derivative obtained in Example 1 (g) followed by stirring at 120° C. for 1 h. The reaction mixture was subsequently poured into a flat cup when still hot and heated to 150° C. in an oven under vacuo for 30 minutes. The non-fluorinated polymer was obtained after cooling down to 20° C. under in the presence of ethanol and subsequent drying in vacuo.

Examples 14 describes different blends of the different components (a), (c), and or (d)

Example 14

Blends were obtained using two different methods: (i) compounding with extruder, or (ii) solution blending.

General Description of Method (i): Compounding

The desired amount(s) of selected polymer for component (a) and/or the selected polymer for component (c) was/were brought into a Minilab twin-screw extruder (Haake) at 120° C. and cycled at 40 rpm. If component (d) was also present in the blend, the desired amount of (d) was subsequently slowly added to the extruder followed by recirculating the molten polymer blend in a closed loop at 120° C. and 80 rpm for 5 minutes, after which the polymer blend comprising the different components was flushed from the extruder and cooled to 25° C. The fluorinated supramolecular material was obtained as a solid and could optionally be obtained as pellet or a fiber when a pelletizer or spinneret was used to collect the polymer melt. Generally, 5-7 grams of material were used per production run.

General Description of Method (ii): Solution

The selected polymer for component (a) and/or the selected polymer for component (c) was/were dissolved in hexafluoropropanol (HFIP) having a final solids content between 5 and 15 weight %. If component (d) was also present in the blend, the desired amount of (d) was subsequently added to the HFIP-solution. After evaporation of the solvent, the fluorinated supramolecular material was obtained as a solid and could optionally be obtained as a sheet, fiber or non-woven when filmcasting or (wet-)spinning was applied to collect the material from the solution. Generally, 1-3 grams of material were used per production run.

TABLE 1

Composition and production method of the blends obtained in Example 17

| Entry | Component (a)/weight % | Component (c)/weight % | Component (d)/weight % | method | appearance |
|---|---|---|---|---|---|
| A | Example 10/ 55% | — | Fomblin Y25/45% | compounding | White soft rubber |
| B | Example 10/ 70% | — | Fomblin ZDOL/30% | compounding | White soft rubber |

TABLE 1-continued

Composition and production method of the blends obtained in Example 17

| Entry | Component (a)/weight % | Component (c)/weight % | Component (d)/weight % | method | appearance |
|---|---|---|---|---|---|
| C | Example 10/ 9% | Example 13/ 91% | — | compounding | Flexible material |
| D | Example 10/ 4% | Example 13/ 91% | Fomblin Y25/5% | compounding | Flexible material |
| E | — | Example 13/ 91% | Fomblin Y25/9% | solution | Flexible material |
| F | Example 10/ 10% | Example 13/ 90% | — | solution | Flexible material |
| G | — | Example 13/ 90% | Fomblin Y25/10% | compounding | Flexible material |

Experiments 15 and 16 describe self-healing properties of the materials

Experiment 15

Flakes of Example 7 were distributed on an aluminium plate followed by heating to 120° C. for 5 minutes after which the flakes had formed a homogeneous, slightly hazy, film on the aluminium plate. After cooling down to room temperature a solid homogeneous coating consisting of the fluoropolymer of Example 7 was formed.

This coating was subsequently damaged by scratching it with a knife resulting in a scratch which was visible with the naked eye. Self-healing of this coating was performed by putting it in on a hot plate of 140° C. for 15 seconds after which the material had flowed into the damaged area an the homogeneous coating was restored after cooling to room temperature.

Experiment 16

A rectangular shaped solid particle consisting of the polymer blend of Example 14C was cut in 2 parts, separated for 30 seconds, followed by pressing the two newly formed interfaces together for 10 seconds, thereby reshaping the original rectangular shaped particle. After releasing the pressure on the solid objects, the two parts were bond together as reflected by their load-bearing capacity and their tensile strength which was at least 90% of the original tensile strength.

The invention claimed is:

1. A fluorinated supramolecular material, comprising a mixture of (I) a fluorinated supramolecular polymer, (II) a non-fluorinated polymer, and (III) a fluoropolymer different from (I) and having a molecular weight of 600 to 5000;
wherein (I) accounts for 1-50 wt. % of the fluorinated supramolecular material, and (II) and (III) account for 50-99 wt. % of the fluorinated supramolecular material, based on the total weight of the fluorinated supramolecular material;
said fluorinated supramolecular polymer comprising at least 5% by weight of covalently bonded fluorine atoms, based on the total weight of the fluorinated supramolecular polymer, said fluorinated supramolecular polymer comprising a fluorinated polymer chain and a self-complementary bonding unit capable of forming at least three hydrogen bonds, said bonding unit being covalently bonded to said fluorinated polymer chain wherein the bonding unit is a 4H-unit represented by formula (3), formula (4), or tautomers thereof:

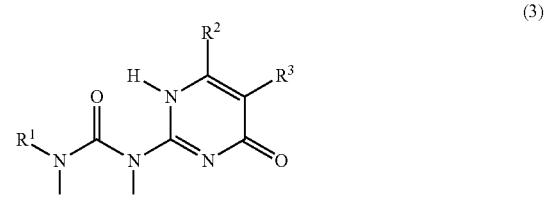

(3)

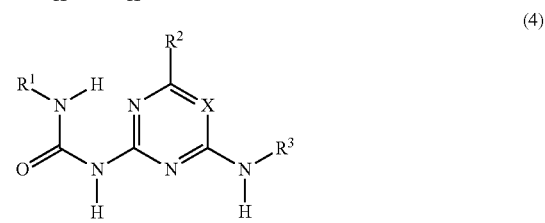

(4)

wherein X is a nitrogen atom or a carbon atom bearing a substituent $R^8$, and wherein $R^1$, $R^2$, $R^3$ and $R^8$ are independently selected from the group consisting of:
(a) hydrogen;
(b) $C_1$-$C_{20}$ alkyl;
(c) $C_6$-$C_{12}$ aryl;
(d) $C_7$-$C_{12}$ alkaryl;
(e) $C_7$-$C_{12}$ alkylaryl;
(f) polyester groups having formula (5)

(5)

wherein $R^4$ is independently selected from the group consisting of hydrogen and $C_1$-$C_6$ linear or branched alkyl, n is 1-6 and m is 10 to 100;
(g) $C_1$-$C_{10}$ alkyl groups substituted with 1-4 ureido groups according to formula (6)

$$R^5\text{—NH—C(O)—NH—} \quad (6)$$

wherein $R^5$ is selected from the group consisting of hydrogen and $C_1$-$C_6$ linear or branched alkyl;
(h) polyether groups having formula (7)

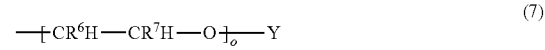

(7)

wherein $R^6$ and $R^7$ are independently selected from the group consisting of hydrogen and $C_1$-$C_6$ linear or branched alkyl and o is 10-100; and
(i) oligopeptide groups consisting of sequences of 1 to 50, preferably 1 to 10, amino acids; and
wherein the 4H-unit is bonded to a polymer backbone via $R^1$, $R^2$ and/or $R^3$ (so that $R^1$, $R^2$ or $R^3$ represent a direct bond) with the other R groups representing independently a side chain according to (a)-(i).

2. The fluorinated supramolecular material according to claim 1, wherein the fluorinated supramolecular polymer comprises 2-50 bonding units.

3. The fluorinated supramolecular material according to claim 1, wherein the number average molecular weight $M_n$, of the fluorinated supramolecular polymer is in the range from about 300 to about 100,000.

4. The fluorinated supramolecular material according to claim 1, wherein the fluorinated supramolecular polymer has a single glass transition temperature $T_g$, wherein the $T_g$ is in the range from about −150° C. to about 200° C.

5. The fluorinated supramolecular material according to claim 1, wherein X is a nitrogen atom.

6. The fluorinated supramolecular material according to claim 1, wherein the fluorinated supramolecular polymer is represented by general formulas (8) and (9):

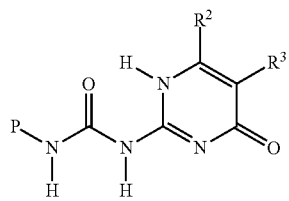

(8)

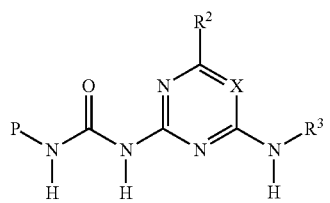

(9)

wherein $R^2$ and $R^3$ are as defined in claim 1 and P represents the fluorinated polymer chain.

7. The fluorinated supramolecular material according to claim 1, wherein the fluorinated supramolecular polymer is represented by general formulas (10) and (11):

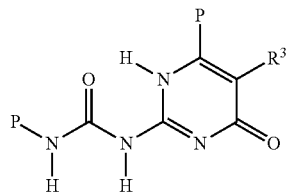

(10)

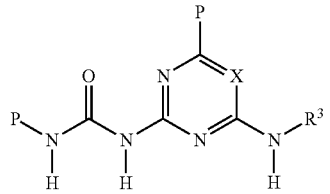

(11)

wherein $R^3$ is as defined in claim 1 and P represents the fluorinated polymer chain.

8. The fluorinated supramolecular material according to claim 1, wherein the fluorinated supramolecular polymer is represented by general formulas (12) and (13):

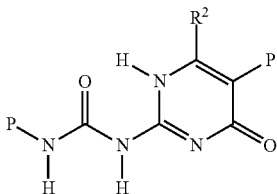

(12)

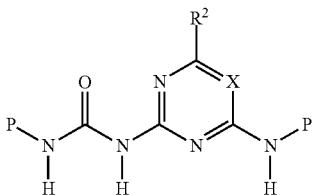

(13)

wherein $R^2$ is as defined in claim 1 and P represents the fluorinated polymer chain.

9. The fluorinated supramolecular material according to claim 1, wherein the relative weight of the fluorinated polymer chain in the fluorinated supramolecular polymer is at least 70% by weight, based on the total weight of the fluorinated supramolecular polymer.

10. The fluorinated supramolecular material according to claim 1, wherein:
the non-fluorinated polymer comprising less than 5% by weight of covalently bonded fluorine atoms, based on the total weight of the non-fluorinated polymer and
the fluoropolymer comprising at least 5% by weight of covalently bonded fluorine atoms, based on the total weight of the fluoropolymer and having a $M_n$, from about 600 to about 5000.

11. The fluorinated supramolecular material according to claim 10, wherein the non-fluorinated polymer comprises at least one bonding unit.

12. The fluorinated supramolecular material according to claim 1, wherein the oligopeptide groups consist of sequences of 1 to 10 amino acids.

13. The fluorinated supramolecular material according to claim 1, wherein the fluoropolymer having a $M_n$ from about 600 to about 5000 comprises at least 5% by weight of covalently bonded fluorine atoms, based on the total weight of the fluoropolymer.

14. The fluorinated supramolecular material according to claim 10, wherein:
the fluorinated supramolecular polymer (I) comprises 2-50 4H-units and a fluorinated polymer chain selected from the group consisting of poly(tetrafluoro ethylene, poly(vinylidene fluoride), poly(vinylfluoride), vinylidene fluoride-copolymers, tetrafluoro ethylene-copolymers, fluorinated polyurethanes, hexafluoroisopropylidene-containing polyesters, polyether ketones, polyimides, polyamides, polycarbonates, polyfluoro(meth)acrylates, fluorosilicones, perfluoropolyethers, and perfluoropolyether-containing polyurethanes;
the non-fluorinated polymer (II) comprises 1-30 4H-units and a polymer chain selected from the group consisting of polyethers, polyesters, polyamides, polycarbonates, polysaccharides, polyvinylalcohols, polysiloxanes, polydienes, polyolefins, polyacrylates, poly(meth)acrylates, and copolymers thereof; and
the fluoropolymer (III) is perfluoropolyethers.

15. The fluorinated supramolecular material according to claim 1, wherein the fluorinated supramolecular polymer (I) accounts for 10-30 wt. % of the fluorinated supramolecular material, and the non-fluorinated polymer (II) and the fluoropolymer (III) account for 70-90 wt. % of the fluorinated supramolecular material, based on the total weight of the fluorinated supramolecular material.

16. The fluorinated supramolecular material according to claim 1, consisting essentially of the fluorinated supramolecular polymer (I), the non-fluorinated polymer (II), and the fluoropolymer (III).

17. The fluorinated supramolecular material according to claim 1, wherein the fluorinated supramolecular material comprises a further functional component selected from the group of functional components that provide a biological activity and functional components that provide a rheological function, wherein fluorinated supramolecular material comprises 0.05-40 wt. % of the further functional component, based on the total weight of the supramolecular fluorinated material.

18. The fluorinated supramolecular material according to claim 17, wherein the biological activity is a therapeutic, diagnostic, medicinal or prophylactic effect.

19. The fluorinated supramolecular material according to claim 17, wherein the functional components that provide a rheological function are selected from the group consisting of thickeners, thixotropic agents and combinations thereof.

* * * * *